(12) United States Patent
Chen

(10) Patent No.: US 9,444,241 B2
(45) Date of Patent: Sep. 13, 2016

(54) TRACK STRUCTURE CAPABLE OF SUPPLYING POWER

(71) Applicant: AOPEN INC., New Taipei (TW)

(72) Inventor: Yi-Jen Chen, New Taipei (TW)

(73) Assignee: Aopen Inc., New Taipei (TW)

( * ) Notice: Subject to any disclaimer, the term of this patent is extended or adjusted under 35 U.S.C. 154(b) by 314 days.

(21) Appl. No.: 14/180,459

(22) Filed: Feb. 14, 2014

(65) Prior Publication Data

US 2014/0305690 A1    Oct. 16, 2014

(30) Foreign Application Priority Data

Apr. 12, 2013  (TW) .............................. 102112980 A

(51) Int. Cl.
*H02G 11/00* (2006.01)
*H02G 3/10* (2006.01)
*H01R 25/14* (2006.01)
(Continued)

(52) U.S. Cl.
CPC ............ *H02G 11/00* (2013.01); *F16M 11/425* (2013.01); *F16M 13/02* (2013.01); *H01R 25/142* (2013.01); *H02G 3/105* (2013.01)

(58) Field of Classification Search
CPC ...... H02G 11/00; H02G 3/105; H01R 25/14; H01R 25/142; F16M 13/00; F16M 13/02; F16M 11/425
USPC ............. 248/200, 205, 107, 220.21, 220.22, 248/274.1, 309.1, 311.2, 346.01, 346.03; 174/481, 480, 503, 51, 50, 57, 58, 59, 174/60; 361/679.01, 728, 729, 730, 807, 361/809, 810, 814, 826; 220/3.2, 3.3, 3.9, 220/4.02; 439/110, 116, 119, 121
See application file for complete search history.

(56) References Cited

U.S. PATENT DOCUMENTS

| | | | | |
|---|---|---|---|---|
| 3,392,244 A | * | 7/1968 | Hillmann | H02G 5/04 104/121 |
| 3,646,613 A | * | 2/1972 | Matsumoto | G11C 19/00 104/130.08 |
| 3,649,951 A | * | 3/1972 | Routh | H01R 25/14 439/117 |

(Continued)

FOREIGN PATENT DOCUMENTS

CN    2938483 Y    8/2007

OTHER PUBLICATIONS

Communication From the Chinese Patent Office Regarding a Counterpart Foreign Application Dated Dec. 3, 2015.
(Continued)

*Primary Examiner* — Dimary Lopez Cruz
(74) *Attorney, Agent, or Firm* — Rosenberg, Klein & Lee

(57) ABSTRACT

The present disclosure relates to a track structure capable of supplying power, which comprises a track module, a first conducting module, a second conducting module, at least a sliding module, a first electrical transmission module, and a second electrical transmission module. Each track module is provided for disposing an electronic device. The electronic device slides along the track module via the sliding module. The first electrical transmission module is connected to the electronic device, and a first electrode and a second electrode of the sliding module. The first and second electrodes contact the first and second conducting modules, respectively. The second electrical transmission module is connected to the first and second conducing modules and connected to a power supply. The power supply supplies power and transmit the power to the electronic device through the track structure.

11 Claims, 12 Drawing Sheets

(51) Int. Cl.
*F16M 11/42* (2006.01)
*F16M 13/02* (2006.01)

(56) References Cited

U.S. PATENT DOCUMENTS

| | | | | |
|---|---|---|---|---|
| 3,848,714 A | * | 11/1974 | Claxton | F21V 21/35 |
| | | | | 191/22 R |
| 4,217,018 A | * | 8/1980 | Yoshida | H02G 5/04 |
| | | | | 439/118 |
| 4,729,742 A | * | 3/1988 | Onishi | H01R 25/14 |
| | | | | 439/208 |
| 8,701,226 B2 | * | 4/2014 | Faucher | B66C 7/08 |
| | | | | 414/921 |

OTHER PUBLICATIONS

"Third rail"; Previous version of current page located at: https://en.wikipedia.org/w/index.php?title=Third_rail&oldid=524889547; as edited by user Hulmem at 02:20, Nov. 26, 2012.
"Report of French rail system"; downloaded from http://www.ceci.org.tw/book/64/64bk10.htm; downloaded Nov. 3, 2015; originally published 2004.
Communication From the Taiwan Patent Office Regarding a Counterpart Foreign Application Dated (Taiwan Year 104) Oct. 2, 2015.

* cited by examiner

TRACK STRUCTURE CAPABLE OF SUPPLYING POWER

FIELD OF THE DISCLOSURE

The present disclosure relates generally to a track structure, and particularly to a track structure for disposing slidably an electronic device and capable of supplying power to the electronic device continuously.

BACKGROUND OF THE DISCLOSURE

Thanks to the progresses in technologies, flat-panel displays (FPDs) have almost replaced completely cathode ray tube (CRT) displays and become the mainstream in modern display technologies. Compared with the bulky size of traditional CRT displays, FPDs have the advantages of low power consumption, low radiation, and thin outlines. In addition, the expansion in the size of FPDs also popularizes thin digital TVs in consumer and entertainment applications such as home viewing, outdoor advertisements, and exhibition purposes.

Currently, FPDs are mostly mounted on walls using frames. They can be disposed on tables or ground using tripods. Alternatively, they can be hung on ceilings using arm holders. Although FPDs can be disposed at any positions through the above mechanisms, their disposition locations are still limited; they have to be disposed near sockets. As the FPDs are connected to sockets via power cords, the sockets can supply power to the FPDs through the power cords. If the FPDs are away from sockets, longer power cords are required for connecting to sockets. Then the FPDs cannot move to the location exceeding the length of the power cords unless longer power cords are used instead. Nonetheless, sometimes power cords are already fixed to walls or other places. It is tedious to change the power cords. Hence, the FPDs cannot be used with flexibility due to the limits in the lengths of power cords.

Accordingly, the present disclosure provides a track structure capable of supplying power, which is provided for disposing slidably at least an electronic device. As the electronic device slides on the track structure, the track structure can supply power continuously to the electronic device, so that the electronic device can acquire power without connecting to a socket through a power cord. Thereby, the electronic device will not be limited by the length of the power cord and the location of the socket; it can be moved to the desired location according to a user's requirement.

SUMMARY

An objective of the present disclosure is to provide a track structure capable of supplying power, which is provided for disposing slidably at least an electronic device. The electronic device slides on the track structure. The track structure can supply power continuously to the electronic device, so that the electronic device can acquire power without connecting to a socket through a power cord. Thereby, the electronic device will not be limited by the length of the power cord and the location of the socket; it can be moved to the desired location according to a user's requirement.

The present disclosure provides a track structure capable of supplying power, which comprises a track module, a first conducting module, a second conducting module, at least a sliding module, a first electrical transmission module, and a second electrical transmission module. The first conducing module is disposed on the track module. The second conducting module is disposed on the track module and opposing to the first conducting module. The sliding module is disposed slidably on the track module and includes a first electrode and a second electrode. The first and second electrodes contact the first and second conducting modules, respectively. The sliding module is provided for disposing an electronic device. The first electrical transmission module is connected electrically to the first and second electrodes and connected to the electronic device. The second electrical transmission module is connected electrically to the first and second conducting modules and connected to a power supply, which can thereby supply power to the electronic device.

DETAILED DESCRIPTION

In order to make the structure and characteristics as well as the effectiveness of the present disclosure to be further understood and recognized, the detailed description of the present disclosure is provided as follows along with embodiments and accompanying figures.

The electronic devices according to the prior art, such as FPDs, are mostly disposed on walls, tables, or ceilings through frames, tripods, or arm holders. To move the electronic devices, the frames, tripods, or arm holders have to be disassembled first. Besides, the location of the electronic devices is also limited by the length of power cords and the location of sockets. Consequently, the electronic devices cannot move to a desired location according a user's requirement. Accordingly, the present disclosure provides a track structure capable of supplying power, which is provided for disposing slidably an electronic device. The electronic device slides on the track structure. The track structure can supply power continuously to the electronic device. Thereby, the electronic device will not be limited by the length of the power cord and the location of the socket; it can be moved to the desired location according to a user's requirement.

Figure 1:
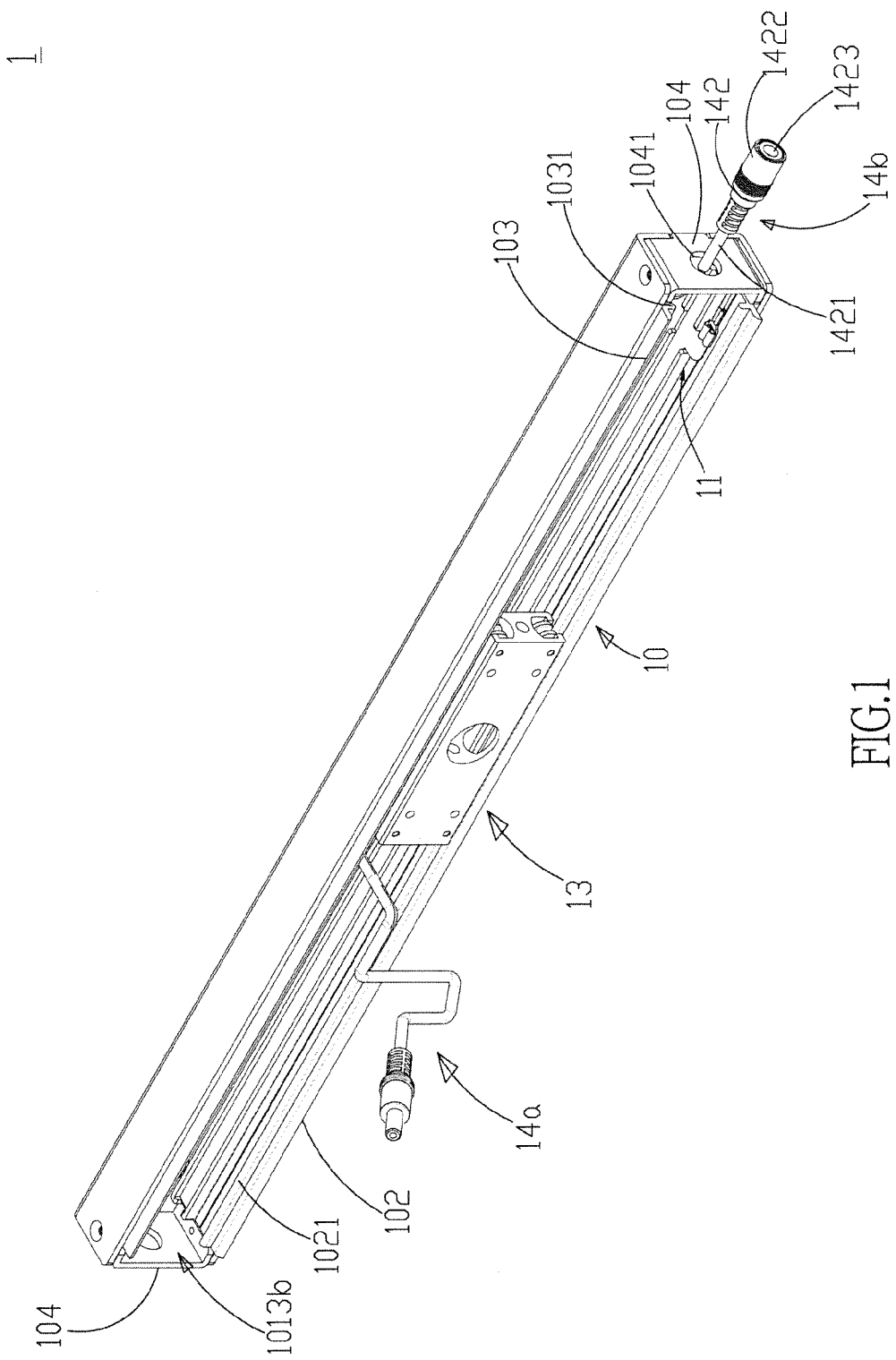
FIG. 1 shows an exterior view of the track structure according to the first embodiment of the present disclosure.
Figure 2:
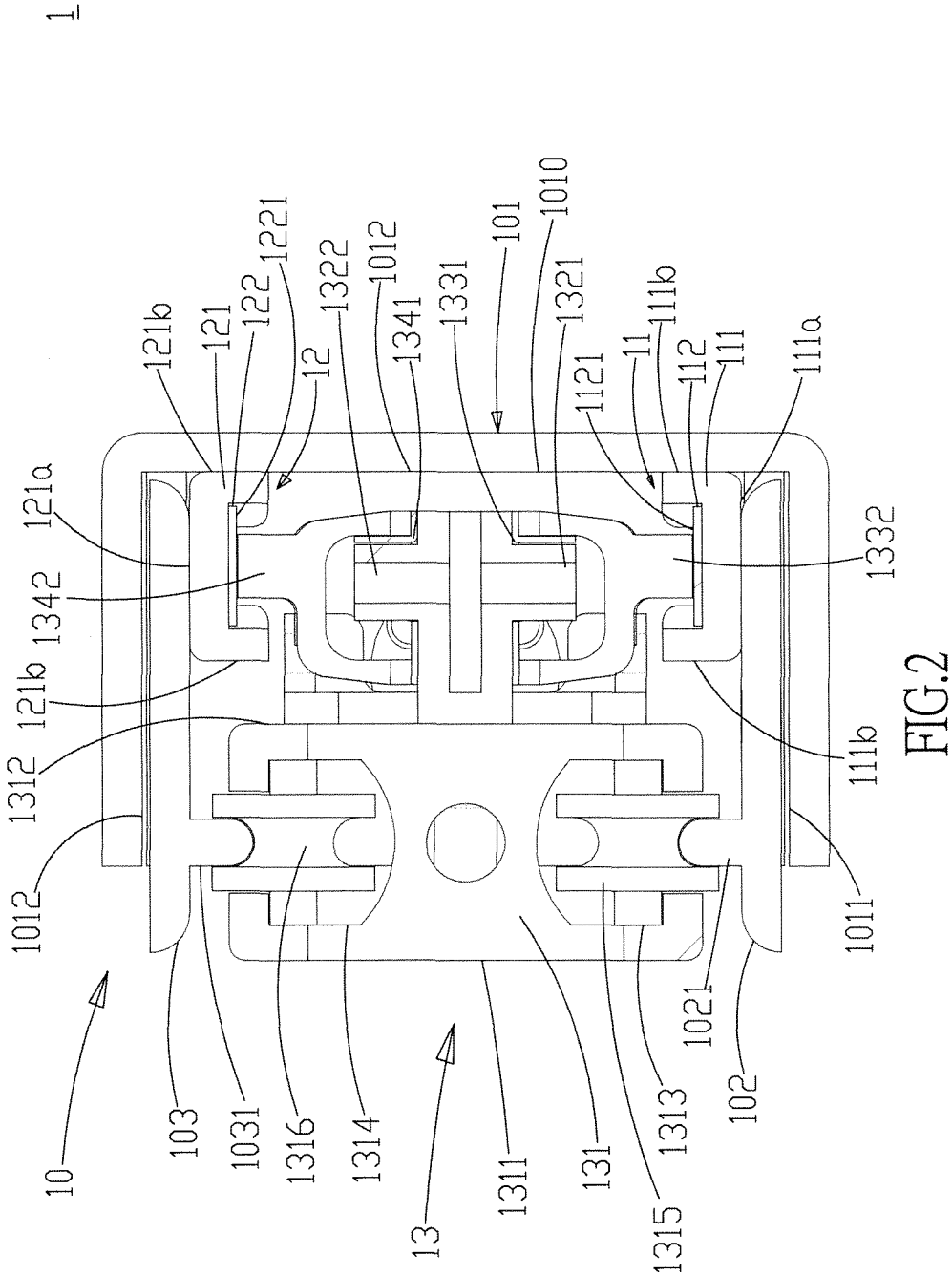
FIG. 2 shows a cross-sectional view of the track structure according to the first embodiment of the present disclosure.
Figure 3:
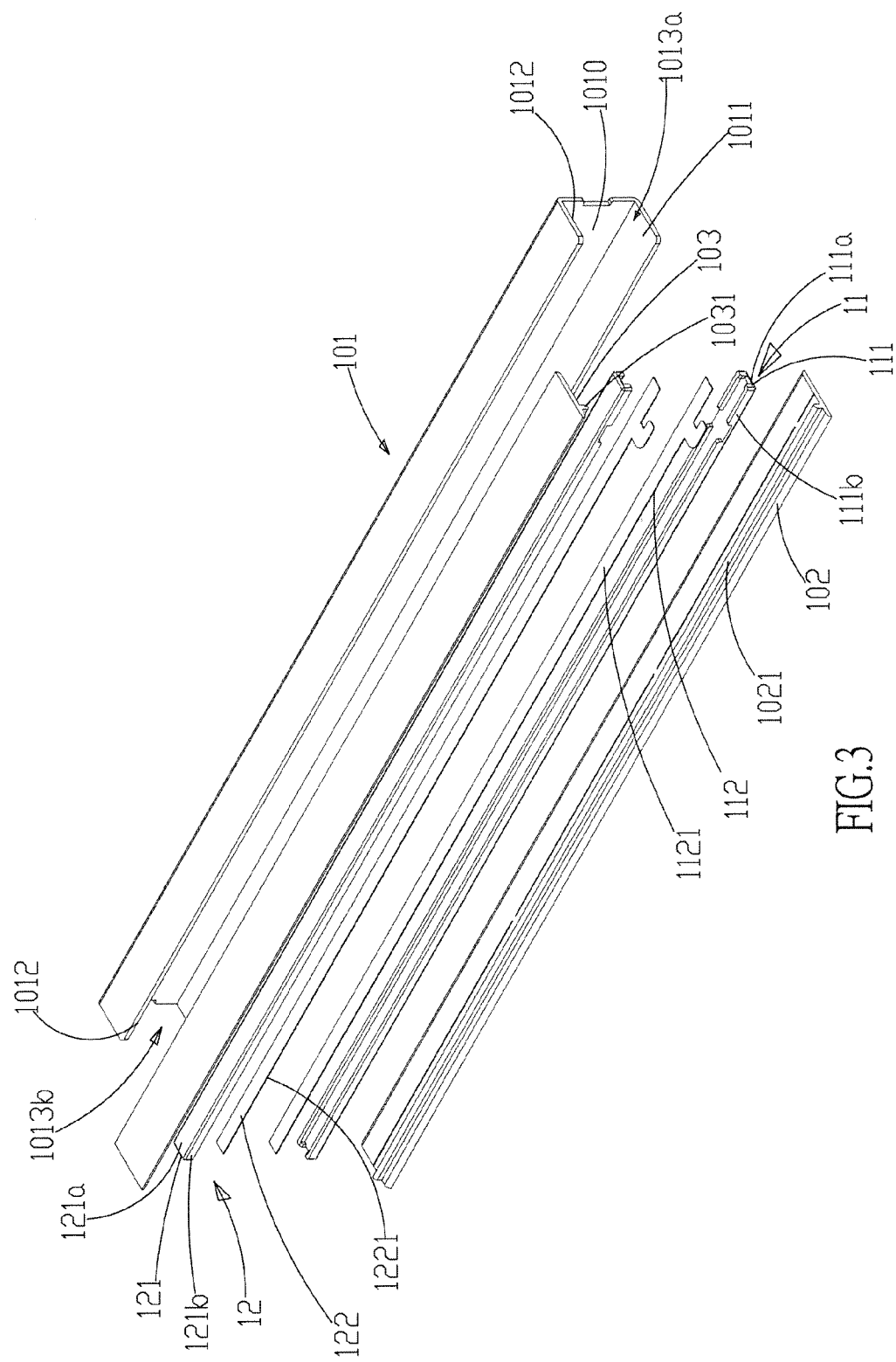
FIG. 3 shows an assembly view of the track module, the first conducting module, and the second conducting module according to the first embodiment of the present disclosure.

FIGS. 1 to 3 show an exterior view and a cross-sectional view of the track structure and an assembly view of the track module, the first conducting module, and the second conducting module according to the first embodiment of the present disclosure. As shown in the figures, the present embodiment provides a track structure 1 capable of supply power. The track structure 1 comprises a track module 10, a first conducting module 11, a second conducting module 12, a sliding module 13, a first electrical transmission module 14a, and a second electrical transmission module 14b. The track module 10 comprises a track accommodating base 101, a first track 102, and a second track 103. The track accommodating base 101 has a bottom part 1010, a first sidewall 1011, and a second sidewall 1012. The first and second sidewalls 1011, 1012 are disposed on both sides of the bottom part 1010, respectively, and thus making the track accommodating base 101 U-shaped. The track accommodating base 101 has a first gap 1013a and a second gap 1013b at its both ends, respectively. The first track 102 is disposed on the first sidewall 1011; the second track 103 is disposed on the second sidewall 1012. The first and second tracks 102, 103 have a first strip-shaped convex part 1021 and a second strip-shaped convex part 1031, respectively. The first and second strip-shaped convex parts 1021, 1031 are corresponding to each other and extend to the second gap 1013b from the first gap 1013a along the first and second sidewalls 1011, 1012, respectively.

Next, the first conducting module 11 according to the present embodiment has a first fixing base 111 and a first conductive sheet 112. The first conductive sheet 112 is disposed on the first fixing base 111. A bottom part 111a of the first fixing base 111 is disposed on a first track 102. In addition, the first fixing base 111 is located on one side of the first strip-shaped convex part 1021 of the first track 102 and adjacent closely to the bottom part 1010 of the track accommodating base 101. The first conductive sheet 112 disposed on the first fixing base 111 has a first contact surface 1121 facing the second sidewall 1012 of the track accommodating base 101.

Likewise, the second conducting module 12 has a second fixing base 121 and a second conductive sheet 122. The second conductive sheet 122 is disposed on the second fixing base 121. A bottom part 121a of the second fixing base 121 is disposed on a second track 103 and located on one side of the second strip-shaped convex part 1031 of the second track 103. Besides, the bottom part 121a of the second fixing base 121 is corresponding to the first fixing base 111 and adjacent closely to the bottom part 1010 of the track accommodating base 101. The second conductive sheet 122 disposed on the second fixing base 121 has a second contact surface 1221 facing the first sidewall 1011 of the track accommodating base 101 and corresponding to the first contact surface 1121.

The first fixing base 111 of the first conducting module 11 according to the present embodiment and the second fixing base 121 of the second conducting module 12 have two first sidewalls 111b and two second sidewalls 121b, respectively. The two first sidewalk 111b are disposed on both sides of the bottom part 111a of the first fixing base 111 for covering the first conductive sheet 112 disposed on the first fixing base 111. The two second sidewalls 121b are disposed on both sides of the bottom part 121a of the second fixing base 121 for covering the second conductive sheet 122 disposed on the second fixing base 121. Thereby, direct exposure of the first and second conductive sheets 112, 122 can be avoided; the situation in which a user gets an electric shock by touching them accidentally can be thus prevented.

Figure 4A:
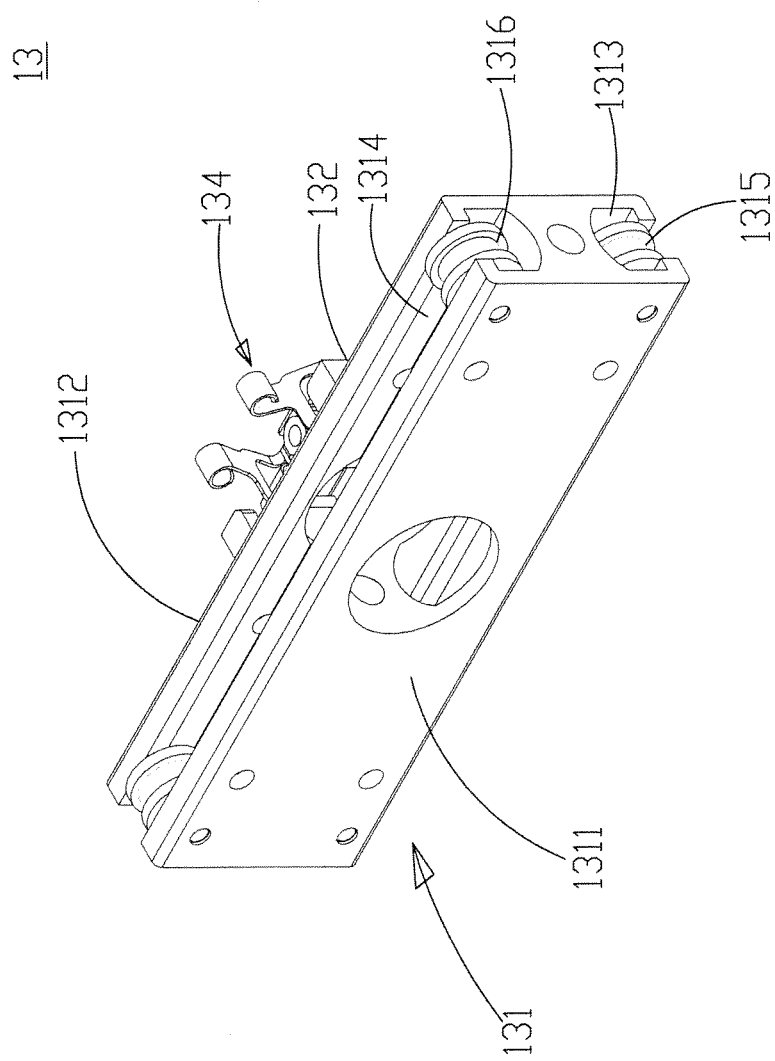
FIG. 4A shows a schematic diagram of the sliding module according to the first embodiment of the present disclosure.
Figure 4B:
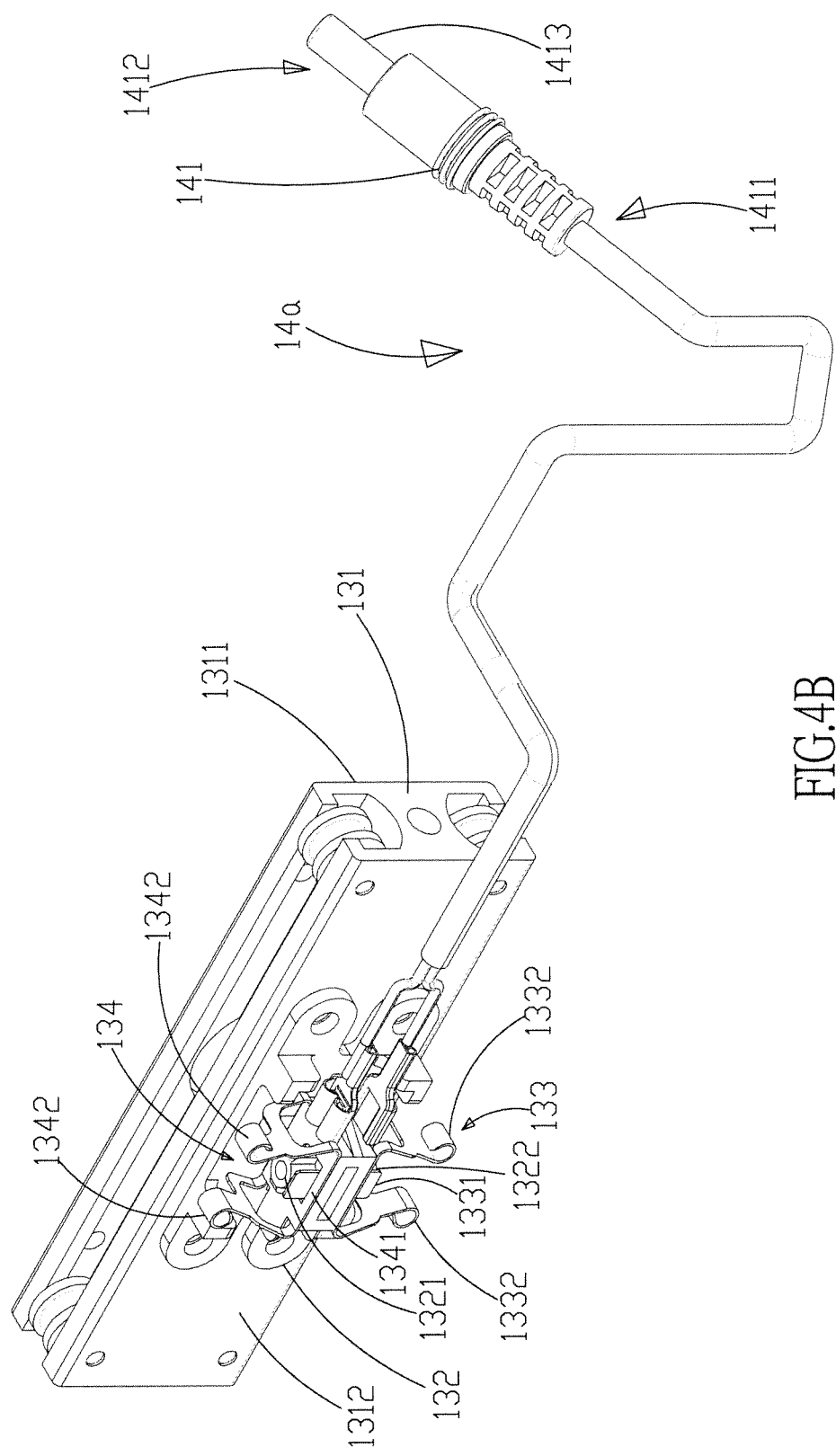
FIG. 4B shows another schematic diagram of the sliding module according to the first embodiment of the present disclosure.

FIGS. 4A and 4B show schematic diagrams of the sliding module according to the first embodiment of the present disclosure. As shown in the figures, the sliding module 13 according to the present embodiment has a sliding base 131, an electrode fixing base 132, a first electrode 133, and a second electrode 134. The sliding base 131 is a block having a first surface 1311 and a second surface 1312 opposing to the first surface 1311. The electrode fixing base 132 is disposed on the second surface 1312. The electrode fixing base 132 according to the present embodiment uses the locking method to lock to the second surface 1312 of the sliding base 131. Of course, other fixing methods can be adopted as well; the details will not be described here. The electrode fixing base 132 has a first connecting part 1321 and a second connecting part 1322 opposing to the first connecting part 1321. The first electrode 133 has a first assembly part 1331 and two first electrical contact parts 1332. The two first electrical contact parts 1332 are connected to both ends of the first assembly part 1331 and located on one side of the first assembly part 1331. The first assembly part 1331 is disposed at the first connecting part 1321. Likewise, the second electrode 134 has a second assembly part 1341 and two second electrical contact parts 1342. The two second electrical contact parts 1342 are connected to both ends of the second assembly part 1341 and located on one side of the second assembly part 1341. The second assembly part 1341 is disposed at the second connecting part 1322.

Figure 5:
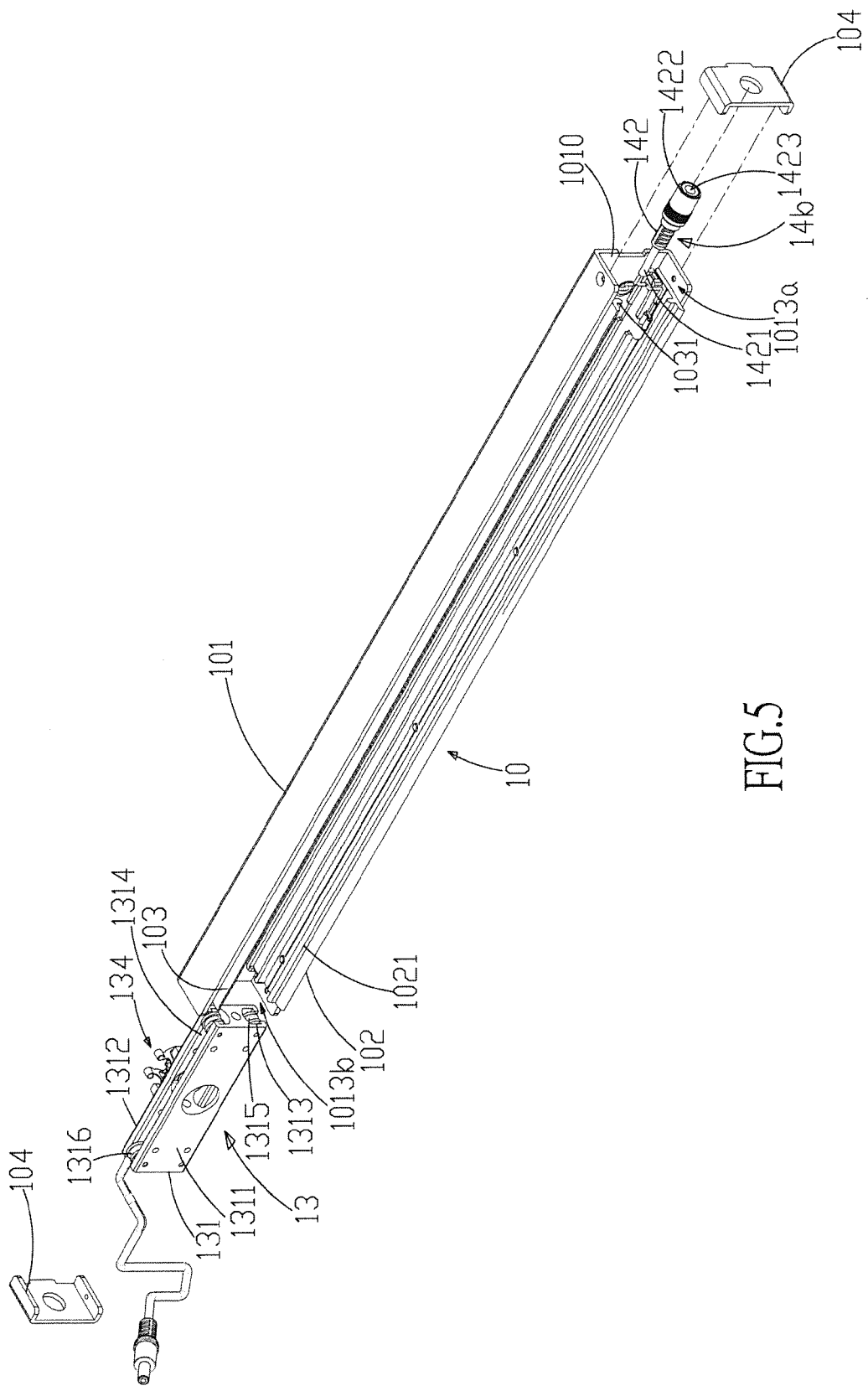
FIG. 5 shows an assembly view of the sliding module assembled on the track module according to the first embodiment of the present disclosure.

FIG. 5 shows an assembly view of the sliding module assembled on the track module according to the first embodiment of the present disclosure. As shown in the figure, when the sliding base 131 enters the space between the first and second tracks 102, 103 from the second gap 1013b of the track accommodating base 101 and slides on the first and second tracks 102, 103, the first surface 1311 of the sliding base 131 is away from the bottom part 1010 of the track accommodating base 101 for disposing an electronic device. The second surface 1312 of the sliding base 131 faces the bottom part 1010 of the track accommodating base 101. The two first electrical contact parts 1332 of the first electrode 133 contact the first contact surface 1121 of the first conductive sheet 112. The two second electrical contact parts 1342 of the second electrode 134 contact the second contact surface 1221 of the second conductive sheet 122 (referring to FIG. 2).

In the following, the detailed structure of the sliding base 131 will be described in details. Please refer to FIG. 4A. The sidewall of the sliding base 131 corresponding to the first track 102 has a first groove 1313; the sidewall of the sliding base 131 corresponding to the second track 103 has a second groove 1314. As the sliding base 131 slides along the first and second tracks 102, 103, the first strip-shaped convex part 1021 of the first track 102 is disposed in the first groove 1313, and the second strip-shaped convex part 1031 of the second track 103 is disposed in the second groove 1314. Thereby, the sliding base 131 can slide along the first and second tracks 102, 103.

For reducing the friction between the sliding base 131 and the first and second tracks 102, 103, at least a first rolling member 1315 and at least a second rolling member 1316 are disposed in the first and second grooves 1313, 1314, respectively. The first rolling member 1315 is disposed pivotally on the sidewall of the first groove 1313 and slides on the first strip-shaped convex part 1021; and the second rolling member 1316 is disposed pivotally on the sidewall of the second groove 1314 and slides on the second strip-shaped convex part 1031. When the sliding base 131 slides on the first and second tracks 102, 103, the first and second rolling members 1315, 1316 roll on the first strip-shaped convex part 1021 of the first track 102 and the second strip-shaped convex part 1031 of the second track 103 simultaneously for reducing the contact area between the sliding base 131 and the first and second tracks 102, 103. By reducing the friction between the sliding base 131 and the first and second tracks 102, 103, the sliding base 131 can thereby slide along the first and second tracks 102, 103 smoothly.

Refer again to FIG. 1. The first electrical transmission module 14a according to the present embodiment is used for connecting electrically the first and second electrodes 133, 134 of the sliding module 13; the second electrical transmission module 14b is used for connecting the first and second conductive sheets 112, 122. Please also refer to FIG. 4B. The first electrical transmission module 14a includes a first connector 141, which includes a first end 1411 and a second end 1412. The first end 1411 is connected electrically to the first and second electrodes 133, 134 of the sliding base 131. The second end 1412 is used for connecting to a power connecting port of the electronic device disposed at the sliding base 131. The second end 1412 of the first connector 141 has a first electrical transmission interface 1413 corresponding to the electrical transmission interface of the power connecting port of the electronic device.

Refer again to FIG. 5. The second electrical transmission module 14b has a second connector 142, which also includes a first end 1421 and a second end 1422. The first end 1421 enters from the first gap 1013a of the track accommodating base 101 and is connected electrically to the first conductive sheet 112 of the first conducting module 11 and the second conductive sheet 122 of the second conducting module 12 (referring to FIG. 2). The second end 1422 is used for connecting to a power supplying port of a power supply. The second end 1422 of the second connector 142 has a second electrical transmission interface 1423 corresponding to the electrically transmission interface of the power supplying port of the power supply. Thereby, the appropriate first and second connectors 141, 142 can be selected according to the electrical transmission interfaces of the power supplying port of the power supply and the power connecting port of the electronic device.

The track module 10 according to the present embodiment further comprises two side lids 104 disposed on the first and second gaps 1013a, 1013b of the track accommodating base 101, respectively, and fixed on the first and second sidewalls 1011, 1012 for sealing the both ends of the track accommodating base 101. Thereby, the sliding module 13 will not slide out of the track accommodating base 101. In addition, it also prevents the first and second sidewalls 1011, 1012 (referring to FIG. 3) from deforming outwards due to loading the electronic device. Refer again to FIG. 1. The side lid 104 disposed on the first gap 1013a has a hole 1041. The first end 1421 of the second electrical connector 142 can pass through the hole 1041 and thus connecting electrically the first end 1421 of the second electrical connector 142 with the first and second conductive sheets 112, 122.

Figure 6:
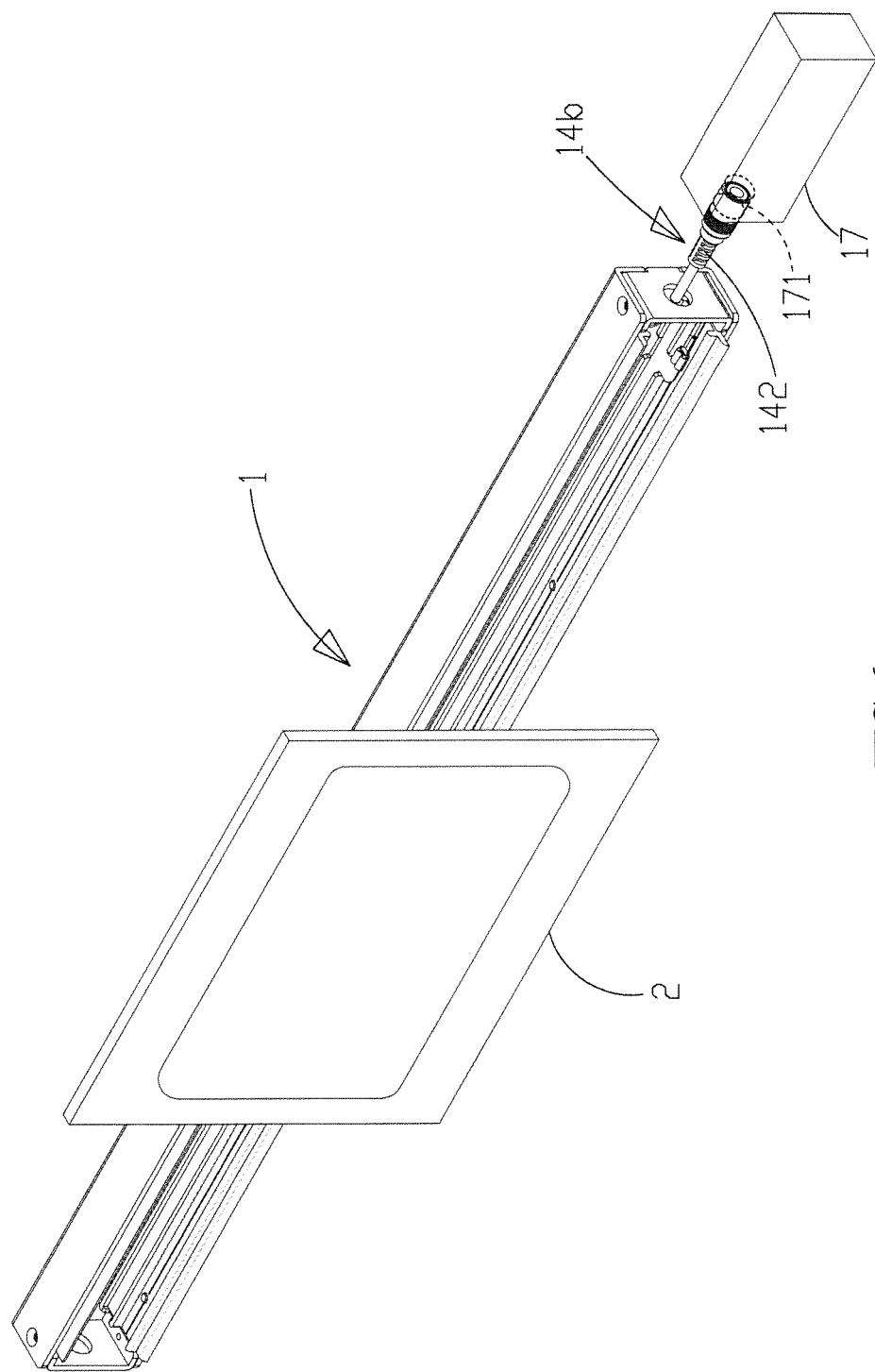
FIG. 6 shows a usage status diagram of the track structure according to the first embodiment of the present disclosure.
Figure 7:
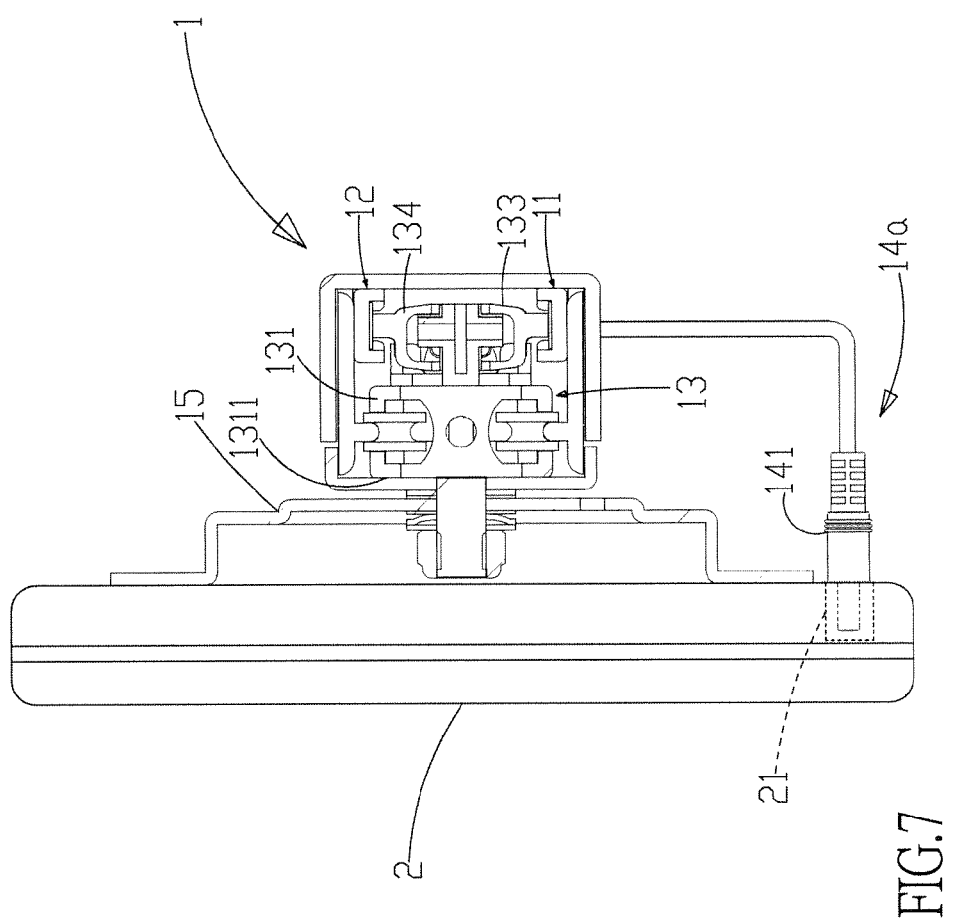
FIG. 7 shows another cross-sectional view of the track structure according to the first embodiment of the present disclosure.

FIG. 6 and FIG. 7 show a usage status diagram and another cross-sectional view of the track structure according to the first embodiment of the present disclosure. As shown in the figures, while using the track structure 1 according to the present embodiment, the track structure 1 can be first fixed to a wall or an exhibition frame, which mainly includes fixing the track accommodating base 101 (referring to FIG. 1) to the wall or the exhibition frame. The method for fixing the track accommodating base 101 to the wall or the exhibition frame can be locking, gluing, or other fixing methods. The details will not be described here.

After the track structure 1 is fixed to the wall or the exhibition frame, an electronic device 2 is disposed on the first surface 1311 of the sliding base 131 of the sliding module 13. The electronic device 2 is disposed on the first surface 1311 of the sliding base 131 through a carrying base 15. In other words, the carrying base 15 is first disposed on the first surface 1311 of the sliding base 131. The electronic device 2 is disposed to the carrying base 15. The area of the carrying base 15 according to the present embodiment is larger than that of first surface 1311 of the sliding base 131. Thereby, the contact area between the carrying base 15 and the electronic device 2 is larger. Then the carrying base 15 can provide greater support to the electronic device 2.

After the electronic device 2 is disposed on the sliding base 131, the first connector 141, which is connected electrically with the first and second electrodes 133, 134, is connected to a power connecting port 21 of the electronic device 2. Besides, the second connector 142, which is connected electrically with the first and second conductive sheets 112, 122, is connected to the power supplying port 171 of the power supply 17. Thereby, the power supply 17, the first conducting module 11, the first electrode 133 of the sliding module 13, the electronic device 2, the second electrode 134 of the sliding module 13, and the second conductive module 12 form a conductive loop. As the power supply 17 supplies power, the power is transmitted to the electronic device 2 through the conductive loop. The output voltage of the power supply 17 complies with the input voltage of the electronic device 2.

Figure 8:
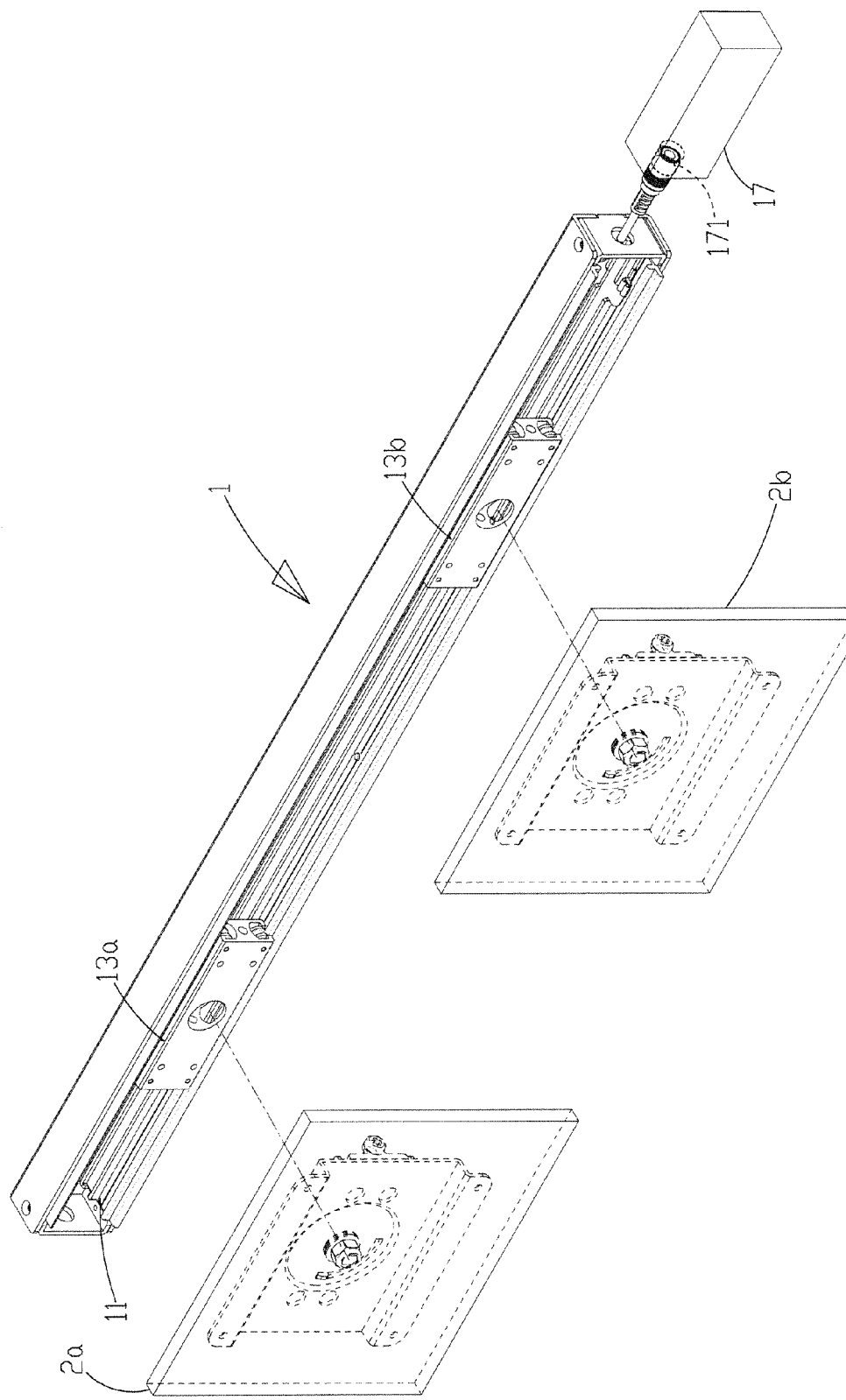
FIG. 8 shows a usage status diagram of the track structure according to the second embodiment of the present disclosure.

FIG. 8 shows a usage status diagram of the track structure according to the second embodiment of the present disclosure. As shown in the figure, there is only one electronic device disposed at the track structure 1 according to the previous embodiment. The track structure 1 according to the present embodiment connects a first electronic device 2a and a second electronic device 2b in series. Accordingly, the track structure 1 according to the present embodiment has a first sliding module 13a and a second sliding module 13b sliding on the sliding module 10. The first electronic device 2a is disposed at the first sliding module 13a; the second electronic device 2b is disposed at the second sliding module 13b. Then, the power supply 17, the first conducting module 11, the first electrode of the first sliding module 13a, the first electronic device 2a, the second electrode of the first sliding module 13a, and the second conductive module (as the second conductive module 12 shown in FIG. 1) form a first conductive loop. Likewise, the power supply 17, the first conducting module 11, the first electrode of the second sliding module 13b, the second electronic device 2b, the second electrode of the second sliding module 13b, and the second conductive module form a second conductive loop. When the power supply 17 supplies power, the power is transmitted to the first and second electronic devices 2a, 2b through the first and second conductive loops, respectively.

If the input voltages of the first and second electronic devices 2a, 2b are different, for example, 110 volts for the first electronic device 2a and 220 volts for the second electronic device 2b, the track structure 1 according to the present embodiment still needs to connect to only one power supply 17. The output voltage of the power supply 17 is made to comply with the input voltage of the second electronic device 2b for supplying power to the second electronic device 2b. Meanwhile, the output voltage of the power supply 17 is greater than the input voltage of the first electronic device 2a; it still can supply power to the first electronic device 2a. According to the above description, the track structure 1 according to the present embodiment is connected to only one power supply 17 and is able to supply power to both electronic devices at the same time. Similarly, the track structure 1 according to the present embodiment is able to supply power to two or more than two electronic devices as well. Of course, each electronic device is disposed at the corresponding sliding module. Namely, the number of the sliding modules should be identical to the number of the electronic devices. The details will not be discussed further.

Figure 9:
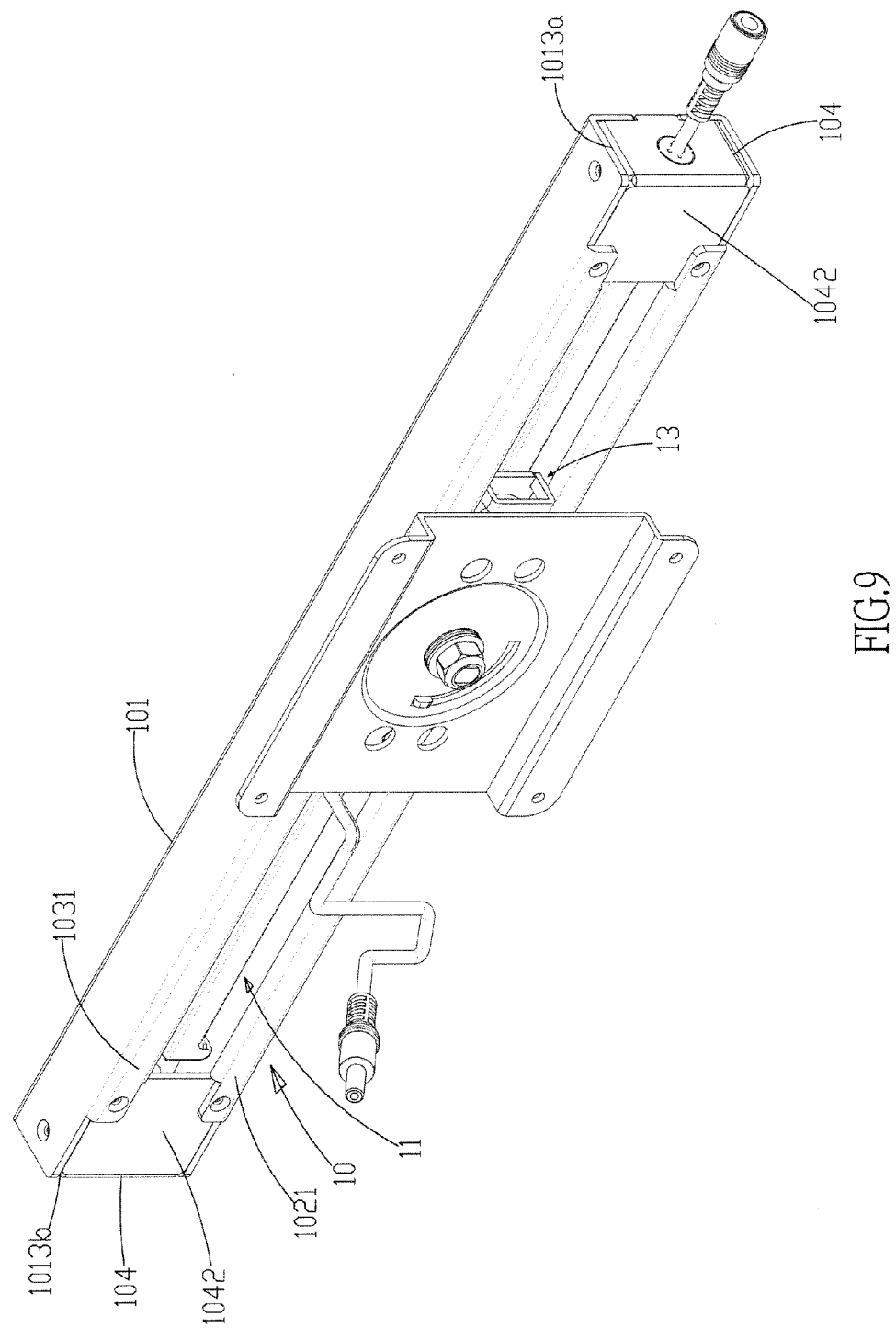
FIG. 9 shows an exterior view of the track structure according to the third embodiment of the present disclosure.
Figure 10:
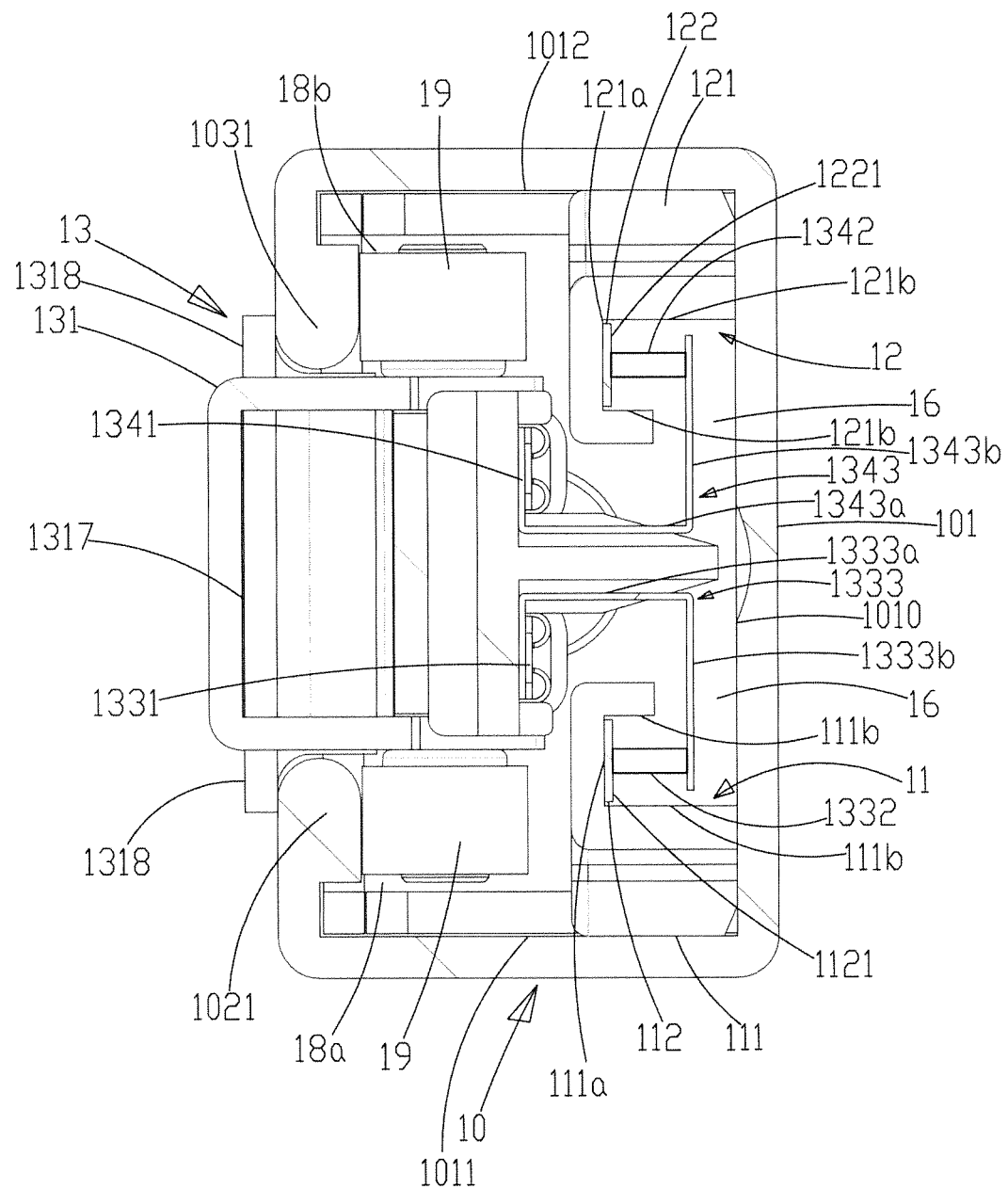
FIG. 10 shows a cross-sectional view of the track structure according to the third embodiment of the present disclosure.
Figure 11:
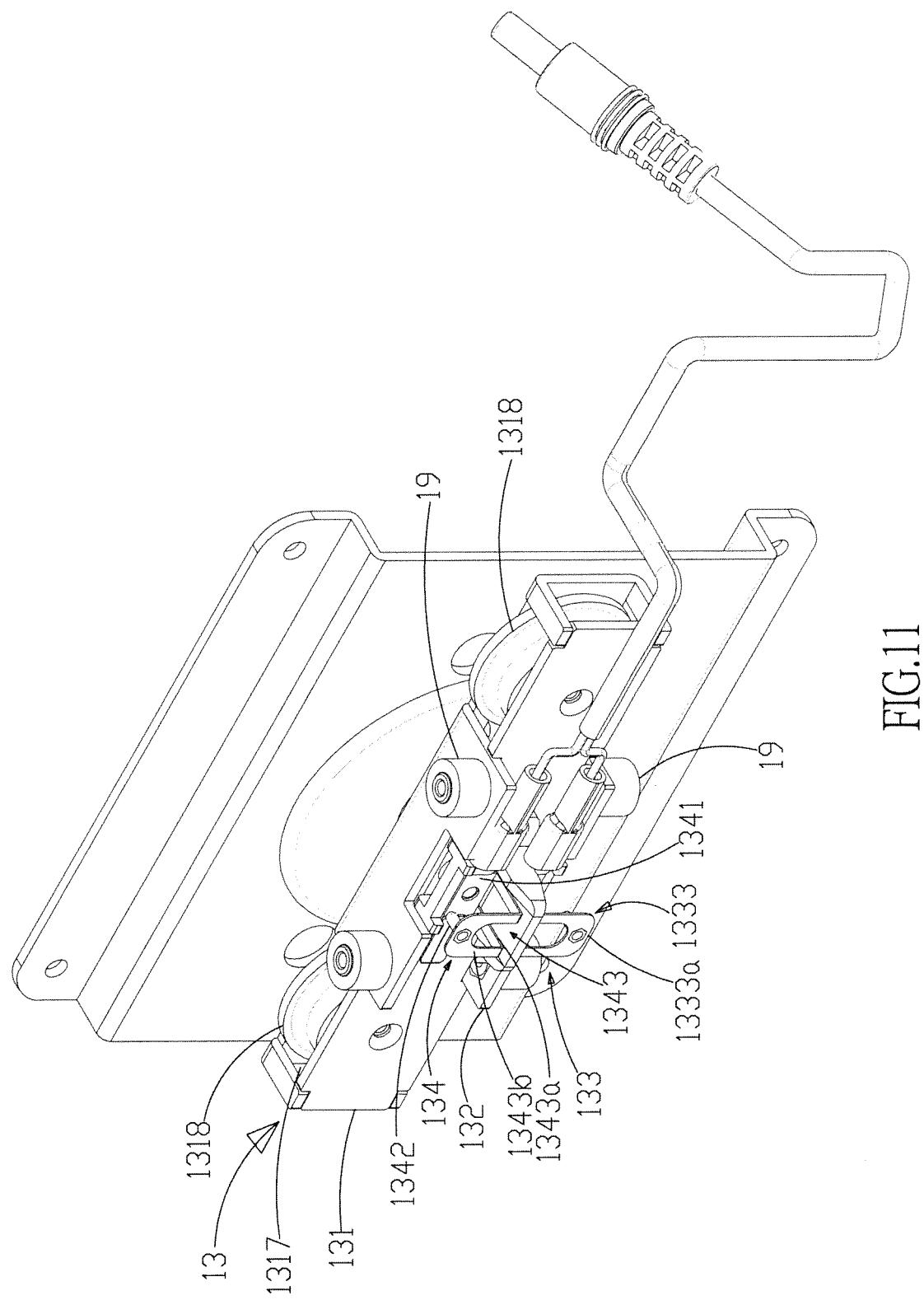
FIG. 11 shows a schematic diagram of the sliding module according to the third embodiment of the present disclosure.

FIGS. 9 to 11 show an exterior view and a cross-sectional view of the track structure and a schematic diagram of the sliding module according to the third embodiment of the present disclosure. As shown in the figure, the difference between the track structure 1 according to the present embodiment and the one according to the previous one is that the track module 10 according to the present embodiment has the first and second track in the first embodiment formed integrally with the track accommodating base 101. A first strip-shaped convex part 1021 is disposed on the side of the first sidewall 1011 of the track accommodating base 101 according to the present embodiment opposing to the bottom part 1010. The first strip-shaped convex part 1021 extends towards the second sidewall 1012 of the track accommodating base 101. A second strip-shaped convex part 1031 is disposed on the side of the second sidewall 1012 of the track accommodating base 101 opposing to the bottom part 1010. The second strip-shaped convex part 1031 extends towards the first sidewall 1011 of the track accommodating base 101.

In addition, one of the two first sidewalls 111b of the first fixing base 111 of the first conducting module 11 is disposed on the first sidewall 1011 of the track accommodating base 101 and connected with the bottom part 1010 of the track accommodating base 101. Besides, the bottom part 111a of the first fixing base 111 is perpendicular to the first sidewall 1011 of the track accommodating base 101. The other one of the two first sidewalls 111b of the first fixing base 111 extends towards the bottom part 1010 of the track accommodating base 101. There is a gap 16 between the other one of the two first sidewalls 111b of the first fixing base 111 and the bottom part 1010 of the track accommodating base 101. Likewise, one of the two second sidewalls 121b of the second fixing base 121 of the second conducting module 12 is disposed on the second sidewall 1012 of the track accommodating base 101 and connected with the bottom part 1010 of the track accommodating base 101. Besides, the bottom part 121a of the second fixing base 121 is perpendicular to the second sidewall 1012 of the track accommodating base 101. The other one of the two second sidewalls 121b of the second fixing base 121 extends towards the bottom part 1010 of the track accommodating base 101. There is a gap 16 between the other one of the two second sidewalls 121b of the second fixing base 121 and the bottom part 1010 of the track accommodating base 101.

Moreover, the first conductive sheet 112 is disposed on the first fixing base 111 and located between the two first sidewalls 111b of the first fixing base 111. The first contact surface 1121 of the first conductive sheet 112 faces the bottom part 1010 of the track accommodating base 101. Similarly, the second conductive sheet 122 is disposed on the second fixing base 121 and located between the two second sidewalls 121b of the second fixing base 121. The second contact surface 1221 of the second conductive sheet 122 also faces the bottom part 1010 of the track accommodating base 101. Thereby, the first and second conductive sheets 112, 122 are not exposed. In other words, they cannot be seen directly from the outside of the track structure 1. The situation in which a user gets an electric shock by touching them accidentally can be thus prevented, improving effectively the safety of the track structure 1.

The sliding module 13 disposed slidably on the track module 10 and contacting the first and second conducting modules 11, 12 is different from the structure of the sliding module 13 according to the previous embodiment. It is mainly because the structures of the track module 10, the first conducting module 11, and the second conducting module 12 are different, and thus changing the structure of the sliding module 13. The sliding module 13 also has the sliding base 131, the electrode fixing base 132, the first electrode 133, and the second electrode 134. The sliding base 131 according to the present embodiment has the first and second grooves in the sliding base 131 according to the first embodiment communicate with each other and forming a groove 1317. At least a rolling member 1318 is disposed pivotally on the two sidewalls of the groove 1317, respectively. The rolling members 1318 slide on the first and second strip-shaped convex parts 1021, 1031. As the sliding base 131 slides on the first and second strip-shaped convex parts 1021, 1031, the rolling members 1318 roll along the first and second strip-shaped convex parts 1021, 1031.

The structures of the first and second electrodes 133, 134 according to the present embodiment are different from the structures of the first and second electrodes 133, 134 according to the first embodiment. The first electrode 133 according to the present embodiment has a first assembly part 1331 and a first electrical contact part 1332. There is a first connecting member 1333 between the first assembly part 1331 and the first electrical contact part 1332. The first connecting member 1333 has a first end part 1333a and a second end part 1333b connecting with the first end part 1333a. The first end part 1333a is connected with the first assembly part 1331 and extends towards the bottom part 1010 of the track accommodating base 101. One end of the second end part 1333b is connected with the first end part 1333a and opposing to the first assembly part 1331. The other end of the second end part 1333b passes through the gap 16 between the first fixing base 111 and the bottom part 1010 of the track accommodating base 101, extends towards the first sidewall 1011, and corresponds to the first conductive sheet 112. The other end of the second end part 1333b is connected with the first electrical contact part 1332. The first electrical contact part 1332 contacts the first contact surface 1121 of the first conductive sheet 112.

Likewise, the second electrode 134 has a second assembly part 1341 and a second electrical contact part 1342. There is a second connecting member 1343 between the second assembly part 1341 and the second electrical contact part 1342. The second connecting member 1343 has a first end part 1343a and a second end part 1343b connecting with the first end part 1343a. The first end part 1343a is connected with the second assembly part 1341 and extends towards the bottom part 1010 of the track accommodating base 101. One end of the second end part 1343b is connected with the first end part 1343a and opposing to the second assembly part 1341. The other end of the second end part 1343b passes through the gap 16 between the second fixing base 1211 and the bottom part 1010 of the track accommodating base 101, extends towards the second sidewall 1012, and corresponds to the second conductive sheet 122. The other end of the second end part 1343b is connected with the second electrical contact part 1342. The second electrical contact part 1342 contacts the second contact surface 1221 of the second conductive sheet 122.

According to the present embodiment, there is a first sliding space 18a between the first strip-shaped convex part 1021 and the first fixing base 111 of the first conducting module 11; and there is a second sliding space 18b between the second strip-shaped convex part 1031 and the second fixing base 121 of the second conducting module 12. At least a positioning rolling member 19 is disposed pivotally on the two sidewalls of sliding base 131 according to the present embodiment corresponding to the first and second sliding spaces 18a, 18b. The plurality of positioning rolling members 19 are against one side of the first and second strip-shaped convex parts 1021, 1031, respectively, and located in the first and second sliding spaces 18a, 18b, respectively, for positioning the sliding base 131. Thereby, the rolling members 1318 of the sliding base 131 can be ensured to roll on the first and second strip-shaped convex parts 1021, 1031.

According to the present embodiment, the two side lids 104 disposed at the first and second gaps 1013a, 1013b further have a connecting sidewall 1042, respectively. The connecting sidewall 1042 is disposed on one side of the side lid 104. When the side lid 104 is disposed at the first or second gap 1013a, 1013b, the connecting sidewall 1042 of the side lid 104 is fixed to the first and second strip-shaped convex parts 1021, 1031, and making the connecting sidewall 1042 parallel with the bottom part 1010 of the track accommodating base 101. In addition, the side lid 104 is locked to the first and second sidewalls 1011, 1012 of the track accommodating base 101. The connecting sidewall 1042 of the side lid 104 is used for reinforcing the track accommodating base 101. The supporting area of the side lid 104 to the track accommodating base 101 is thereby increased for avoiding the track structure 1 from deforming outwards due to loading the electronic device. The method for using the track structure 1 according to the present embodiment is identical to the method for using the one according to the first embodiment. Hence, the details will not be described further.

To sum up, the present disclosure relates to a track structure capable of supplying power, which is provided for disposing slidably at least an electronic device. The electronic device slides on the track structure. The track structure can supply power continuously to the electronic device, so that the electronic device can acquire power without connecting to a socket through a power cord. Thereby, the electronic device will not be limited by the length of the power cord and the location of the socket; it can be moved to the desired location according to a user's requirement.

Accordingly, the present disclosure conforms to the legal requirements owing to its novelty, nonobviousness, and utility. However, the foregoing description is only embodiments of the present disclosure, not used to limit the scope and range of the present disclosure. Those equivalent changes or modifications made according to the shape, structure, feature, or spirit described in the claims of the present disclosure are included in the appended claims of the present disclosure.

The invention claimed is:

1. A track structure capable of supplying power, comprising:
a track module, comprising:
    a track accommodating base, having a bottom part, a first sidewall, and a second sidewall, said first sidewall and said second sidewall disposed on both sides of said bottom part, respectively, and said first sidewall corresponding said second sidewall;
    a first track, disposed on said first sidewall and having a first strip-shaped convex part;
    a second track, disposed on said second sidewall, opposing to said first track, and having a second strip-shaped convex part, wherein said second strip-shaped convex part corresponds to said first strip-shaped convex part;
a first conducting module, disposed at said track module, comprising:
    a first fixing base, disposed at said first track, located on one side of said first strip-shaped convex part, and forming a gap between said track accommodating base;
    a first conductive sheet, disposed at said first fixing base, and having a first contact surface facing said bottom part of said track accommodating base;
a second conducting module, disposed at said track module, and opposing to said first conducting module, comprising:
    a second fixing base, disposed at said second track, located on one side of said second strip-shaped convex part, and forming a gap between said track accommodating base;
    a second conductive sheet, disposed at said second fixing base, and having a second contact surface facing said bottom part of said track accommodating base;
at least a sliding module, disposed slidably at said track module, having a first electrode and a second electrode, and provided for disposing an electronic device, wherein, said first electrode contacting said first contact surface of said first conducting module and having a first assembly part, a first connecting member, and a first electrical contact part, wherein, one end of said first connecting member connected to said first assembly part, the other end of said first connecting member passing through said gap adjacent to said first conducting module and connected to said first electrical contact part, said first assembly part disposed at a first connecting part of said electrode fixing base, and said first electrical contact part contacting said first contact surface of said first conductive sheet; and said second electrode has a second assembly part, a second connecting member, and a second electrical contact part, one end of said second connecting member connected to said second assembly part, the other end of said second connecting member passing through said gap adjacent to said second conducting module and connected to said second electrical contact part, said second assembly part disposed at a second connecting part of said electrode fixing base, and said second electrical contact part contacting said second contact surface of said second conductive sheet, which comprising:
    a sliding base, sliding on said first track and said second track, having a first surface and a second surface, and said first surface provided for disposing said electronic device;
    an electrode fixing base, disposed on said second surface of said sliding base, and said first electrode and said second electrode disposed at said electrode fixing base and contacting said first conducting module and said second conducting module, respectively;

a first electrical transmission module, connected electrically to said first electrode and said second electrode, and connected to said electronic device; and a second electrical transmission module, connected electrically to said first conducting module and said second conducting module, connected to a power supply, and said power supply supplying power to said electronic device.

2. The track structure capable of supplying power of claim 1, wherein said first track, said second track, and said track accommodating base are formed integrally.

3. The track structure capable of supplying power of claim 1, wherein said track accommodating base has a first gap and a second gap at both ends, respectively; and said first gap and said second gap have a side lid, respectively.

4. The track structure capable of supplying power of claim 1, wherein said side lid has a connecting sidewall, connected to said first strip-shaped convex part and said second strip-shaped convex part, and parallel with said bottom part of said track accommodating base.

5. The track structure capable of supplying power of claim 1, wherein said first conductive sheet has a first contact surface contacting said first electrode; said second conductive sheet has a second contact surface contacting said second electrode; and said first contact surface corresponds to said second contact surface.

6. The track structure capable of supplying power of claim 1, wherein said first electrode has a first assembly part and at least a first electrical contact part, said first electrical contact part connecting to said first assembly part, said first assembly part disposed at a first connecting part of said electrode fixing base, and said first electrical contact part contacting said first contact surface of said first conductive sheet; and said second electrode has a second assembly part and at least a second electrical contact part, said second electrical contact part connecting to said second electrode, said second assembly part disposed at a second connecting part of said electrode fixing base, and said second electrical contact part contacting said second contact surface of said second conductive sheet.

7. The track structure capable of supplying power of claim 1, wherein a first sliding space is formed between said track accommodating base and said first fixing base; a second sliding space is formed between said track accommodating base and said second fixing base;

and at least a positioning rolling member is disposed pivotally on two sidewalls of said sliding base corresponding to said first sliding space and said second sliding space, respectively.

8. The track structure capable of supplying power of claim 1, wherein said first electrical transmission module comprises a first connector having a first end and a second end; said first end of said first connector is connected electrically to said first electrode and said second electrode; and said second end of said first connector is connected to said electronic device.

9. The track structure capable of supplying power of claim 1, wherein said second electrical transmission module comprises a second connector having a first end and a second end; said first end of said second connector is connected electrically to said first conductive sheet and said second conductive sheet; and said second end of said second connector is connected to said power supply.

10. A track structure capable of supplying power, comprising:
a track module, comprising:
a track accommodating base, having a bottom part, a first sidewall, and a second sidewall, said first sidewall and said second sidewall disposed on both sides of said bottom part, respectively, and said first sidewall corresponding said second sidewall;
a first track, disposed on said first sidewall and having a first strip-shaped convex part;
a second track, disposed on said second sidewall, opposing to said first track, and having a second strip-shaped convex part, wherein said second strip-shaped convex part corresponds to said first strip-shaped convex part;
a first conducting module, disposed at said track module;
a second conducting module, disposed at said track module, and opposing to said first conducting module;
at least a sliding module, disposed slidably at said track module, having a first electrode and a second electrode contacting said first conducting module and said second conducting module, and provided for disposing an electronic device, which comprising:
a sliding base, sliding on said first track and said second track, having a first surface, a second surface, a first groove and a second groove, wherein, said first surface provided for disposing said electronic device, said first groove disposed slidably on said first strip-shaped convex part, and said second groove disposed slidably on said second strip-shaped convex part, which further comprising:
at least a first rolling member and at least a second rolling member;
said first rolling member is disposed pivotally on the sidewall of said first groove and slidably on said first strip-shaped convex part;
and said second rolling member is disposed pivotally on the sidewall of said second groove and slidably on said second strip-shaped convex part;
an electrode fixing base, disposed on said second surface of said sliding base, and said first electrode and said second electrode disposed at said electrode fixing base and contacting said first conducting module and said second conducting module, respectively;
a first electrical transmission module, connected electrically to said first electrode and said second electrode, and connected to said electronic device; and
a second electrical transmission module, connected electrically to said first conducting module and said second conducting module, connected to a power supply, and said power supply supplying power to said electronic device.

11. The track structure capable of supplying power of claim 1, wherein said sliding base has at least a rolling member disposed slidably on said first strip-shaped convex part and said second strip-shaped convex part.

* * * * *